United States Patent [19]

Kalyanaraman et al.

[11] Patent Number: 5,232,757
[45] Date of Patent: Aug. 3, 1993

[54] ENHANCEMENT OF POSITIVE CONTRAST IN OPTICAL RECORDING

[75] Inventors: Palaiyur S. Kalyanaraman, Fanwood; Harris A. Goldberg, Colonia; Rachel S. Kohn, Springfield, all of N.J.

[73] Assignee: Hoechst Celanese Corp., Somerville, N.J.

[21] Appl. No.: 804,144

[22] Filed: Dec. 6, 1991

[51] Int. Cl.$^5$ ................................................ B32B 3/00
[52] U.S. Cl. ........................................ 428/64; 428/65; 428/447; 428/913; 430/945; 346/76 L; 346/135.1
[58] Field of Search ................ 428/64, 65, 333, 447, 428/913; 430/945; 346/76 L, 135.1; 369/288

[56] References Cited

U.S. PATENT DOCUMENTS 5,139,837  8/1992  Kalyanaraman ................... 428/64

Primary Examiner—Patrick J. Ryan
Assistant Examiner—Elizabeth Evans
Attorney, Agent, or Firm—P. S. Kalyanaraman

[57] ABSTRACT

This invention provides a superior process for optical information storage by providing a mixture of azaannulene compounds in the recording layer. The recording layer exhibits large positive contrast in the recorded areas upon recording with laser radiation. The positive contrast is surprisingly larger than the positive contrasts exhibited by recording layers made from the individual azaannulenes included in the mixture, and because of this large positive contrast the sensitivity of the medium is high and consequently low laser powers are sufficient to effect the recording.

15 Claims, No Drawings

ENHANCEMENT OF POSITIVE CONTRAST IN OPTICAL RECORDING

The present application relates to a process for enhancing the positive contrast during optical data recording by using suitable mixtures of recording layer materials. It also discloses a power efficient process for recording optical information.

CROSS REFERENCE TO RELATED APPLICATION

The subject matter of this patent application is related to that disclosed in U.S. patent application Ser. No. 462,680, filed Jan. 9, 1990, now abandoned.

BACKGROUND OF THE INVENTION

The technology of digital data storage using optical memory devices has advanced rapidly since its inception. Commercial uses at present range from compact discs (CDs) which provide high quality audio reproduction to computer memories which provide extremely large yet compact storage capacity. As applied to the requirements of computer mass storage, optical disks have been categorized according to the ease with which data can be written onto them. Optical read-only memories (OROMs) such as compact discs (CD-ROMs) have data written on to them before they leave the factory; write-once read-many (WORM) disks allow the user to write data onto them once and read that data indefinitely; erasable optical disks permit the user to write and read data with the same flexibility as magnetic storage media such as floppy and hard disks. Jones et al, *Encyclopedia of Polymer Science and Engineering*, Supplement Vol., Second Ed., John Wiley & Sons, New York (1989), pp. 554-567 present a concise discussion of the technology of optical data storage.

One of the reasons that optical storage media have increased in popularity is the very large capacity they provide in a small volume. Information is usually stored on the disk in the form of pits in the recording layer. The pits can consist of holes, which are arranged in tracks, in the recording layer. The holes are usually formed by an intense laser beam focused onto the layer which is formed of a material which absorbs the laser radiation and ablates or melts as a result of heating caused by the energy absorbed. The intensity of the light reflected from the disk is modulated by the presence or absence of the pits. The recording layer may be composed of tellurium alloys, bubble-forming materials, multilayer optical cavities, colloids, microtextured absorbers or organic materials, such as those described by Kalyanaraman et al. in *Functional Polymers*, edited by D. Bergbreiter and C. Martin, Plenum Publishing, New York, pp. 173-191 (1989). The pits are written by a relatively high power laser beam, for example, 10-30 mW, while they are read by a low power laser beam, typically 0.5-1 Mw. Both writing and reading are usually performed by a semiconductor laser, such as those of gallium arsenide.

The light-sensitive material in the recording layer (also called the information layer) normally comprises a material which exhibits a change in its physical characteristics, such a melting or evaporating, to produce a hole or pit, whenever the writing beam is focused thereon. The intensity of the writing beam is modulated according to the information to be recorded, and therefore, is alternately greater than or less than a predetermined threshold, at which the melting or evaporation occurs in the recording layer. A sequence of spaced holes or pits representing the information is thereby formed in the layer. In the reading process, the read beam is reflected off the recorded and unrecorded areas of the disk with different reflectivities. The term ,contrast, is related to and signifies this difference in reflectivity. The difference in reflectivity or reflectivity change is read by the detector and converted back into the information. Generally, in a pit forming process, the recorded areas have lower reflectivities than the unrecorded areas and give rise to negative contrast. On the other hand, if the reflectivity during writing increases in the recorded areas it would give rise to positive contrast. Since, in the positive contrast mode, reflectivity increases in the recorded areas, the laser power needed to write is generally lower than that in a negative contrast mechanism. In other words, the sensitivity of the medium is higher. Also, due to the use of lower energy, the medium may have longer life.

The use of azaannulene compounds such as phthalocyanines, naphthalocyanines, phenanthracyanines, porphyrins, anthracyanines, and the like, as recording layers in optical data storage has been well documented. Some patents in this regard are U.S. Pat. Nos. 4,241,355; 4,298,971; 4,458,004; 4,492,750 and 4,725,525, and EP 0,296,876. As recording layer materials, azaannulene compounds perform generally by a negative contrast process.

U.S Pat. No. 4,946,762 discloses phthalocyanine compounds that undergo non-ablative recording by phase transformation resulting from thermally altering the media during the recording. These thermally altered areas, sometimes described in that patent as 'spots', show an increased reflectivity in the recorded areas.

U.S. patent application Ser. No. 462,680, filed Jan. 9, 1990, discloses azaannulene compounds which show a positive reflectivity change of 20-40% during marking without effecting a visually or optically detectable deformation in the information layer.

U.S. patent application Ser. No. 333,523, filed Apr. 4, 1989, discloses an optical medium comprising a mixture of tetraazaporphyrin dye constituents.

As the technology of optical recording media becomes more sophisticated, the need and desire for more sensitive recording media, thereby requiring less powerful and/or smaller lasers, will become greater. Media requiring less power and less time in which to record information, would be a great advance in the technology. One way to achieve recording at less powers is to have a significant enhancement of the positive contrast which may, in turn, enable the reading of the spots much easier.

Accordingly, it is an object of the present invention to provide a system which can record information on an optical recording medium using less power than is typically used in optical information recording.

Another object of this invention is to provide a process whereby an enhanced positive contrast is produced on optical recording resulting in an easier reading of the information.

It is yet another object of this invention to provide a system which provides enhanced positive contrast reflectivity change in the recorded areas during optical recording.

These and other objects of the present invention will become apparent to the skilled artisan upon a review of the following specification, and the claims.

SUMMARY OF THE INVENTION

In one embodiment the present invention includes an optical recording medium containing a recording layer that comprises a mixture of azaannulene compounds which exhibits enhanced positive contrast in the recorded areas on recording with laser radiation of low powers, e.g., 5 to 8 mW of power. The term "enhanced positive contrast" refers to positive contrast of magnitude higher than either a cumulative, or an average of positive contrasts that recording layers from the individual azaannulenes the mixture normally exhibit. Preferred azaannulene compounds are those described above, with naphthalocyanines being the most preferred.

In another embodiment this invention discloses a process for recording optical information. The process comprises irradiating an optical information medium comprising a recording layer that comprises a mixture of azaannulene compounds which exhibits enhanced positive contrast in the recorded areas. The irradiation is performed by a focused light source, usually a laser, at a power level of about 8 mW or less, for a period of time insufficient to effect a visually detectable deformation in the information layer, yet at a power level and for a time sufficient to provide a large positive contrast in the recorded areas. This process provides one with a highly sensitive recording medium. The azaannulene components in the mixture cooperate to surprisingly effect the enhanced contrast; the quantity of contrast change depends on the nature and ratio of the components making up the mixture.

DESCRIPTION OF THE INVENTION

The recording medium of the present invention comprises an information layer supported by a substrate. The information layer comprises an effective amount of a mixture of azaannulene compounds which cooperate to give an enhanced positive contrast reflectivity reading upon irradiation with a focused laser light source at low powers, i.e., about 8 mW or less. By appropriately choosing the components and their amounts in the mixture, one can achieve significantly increased positive contrast.

The mixture contains two or more azaannulene compounds. Non-azaannulene moieties may also be present in the mixture, but any non-azaannulene, if present, should not adversely affect the capability of the recording layer to show positive contrast or the enhancement of the magnitude of such contrast. An effective amount of each azaannulene is typically at least about 10 % of the total amount of azaannulenes in the mixture.

The azaannulene compounds may be any type described above. Preferred ones are the naphthalocyanines. Naphthalocyanines useful in the present invention are shown in Formula 1:

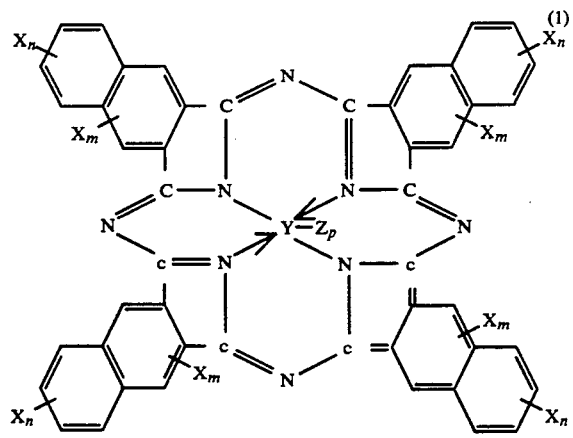

wherein Y is Si, Ge, Sn, Al, Ga, In or a transition metal, more preferably Si or Ge, and most preferably Si;

Z is a halogen, hydroxy, $OR_1$ or $OSiR_2R_3R_4$, wherein $R_1$ is an alkyl having at least four carbons; aryl having at least six carbons; acyl having at least four carbons; cycloalkyl having at least four carbons; or a polyether, and wherein $R_2$, $R_3$ and $R_4$ can be the same or different and are alkyl having from about 1 to about 18 carbons; aryl having from 6 to 10 carbons; cycloalkyl having at least 4 carbons; siloxy; or alkoxy having at least 3 carbons;

with p representing the number of Z substituents and being either 0, 1 or 2, more preferably 1 or 2, and most preferably 2; and wherein the X substituents can be the same or different and are independently selected from halogen,; alkyl having at least 4 carbons; aryl having from 6 to 10 carbons; acyl having at least 4 carbons; $NR_5R_6$; $NO_2$; $OR_7$; $SO_3$—; or $SO_2NR_5R_6$, with $R_5$ and $R_6$ being the same or different and being H; alkyl having form 1 to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and wherein the X substituent is attached to the aromatic ring through the N atom when the substituent is $NR_5R_6$, $R_7$ is the same as R defined above, and with n and m indicating the number of independently selected X substituents, each n being the same or different and ranging from 0 to 4, and each m being the same or different and ranging from 0 to 2.

In the above described naphthalocyanines, when p is a value such that all of the valences of the central atom are not occupied with Z substituents, any other valence or valences can be occupied by any conventional single valence substituent, e.g., hydrogen, halide, or hydroxy, or monoalkoxy. It is preferred that there is at least one Z substituent in the naphthalocyanine chromophores of the present invention.

When a recording layer containing a mixture of naphthalocyanines is formed and recorded with laser radiation in accordance with the present invention, it shows a surprising and beneficial synergistic effect. The magnitude of the positive contrast gets enhanced depending upon the nature of the naphthalocyanines and their respective amounts in the mixture with the enhanced positive contrast being higher than the contrast exhibited by the recording layer from either component. While positive contrast itself is valuable due to the fact that it reduces the power needed to effect a writing on the medium, enhanced positive contrast further reduces the power needed. Reduced laser power in turn effectively reduces the cost of operating the medium. Furthermore, it may also enhance the life of the medium.

Among the naphthalocyanine compounds which are most preferred for the practice of this invention are the silicon naphthalocyanines. Suitable silicon naphthalocyanines are described, for example, in U.S. Pat. Nos. 4,725,525 and 4,977,068. Some such silicon naphthalocyanines are described in Formula 2 through Formula 4:

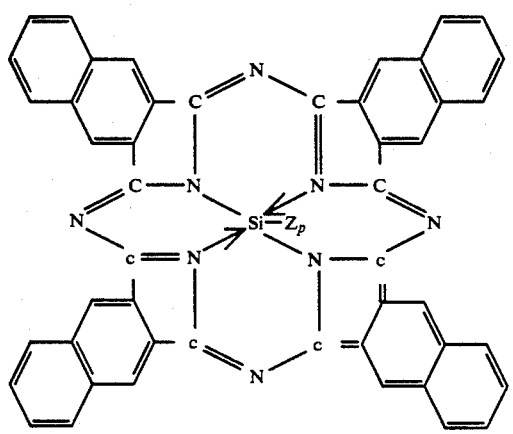

2: $Z_p = [O-Si(CH_3)_2-O-(CH_2)_6-NH-CO-(CH_2)_{14}-CH_3]_2$
3: $Z_p = [O-Si(CH_3)_2-O-(CH_2)_6-NH-CO-CH(CH_3)_2]_2$

4: $Z_p = [O-Si(Phenyl)_2-O-\text{-C}_6H_4-C(CH_3)_2-C_6H_4-OH]_2$

The synthesis of compounds of Formulas 2-4 may be accomplished by procedures well documented in the art. For example, some general procedures for the synthesis of such silicon naphthalocyanines are described in the aforementioned U.S. Pat. Nos. 4,725,525 and 4,977,068.

In coating the recording layer material as the information layer onto the substrate, it is preferred that the chromophore be cast from a solution. The mixture of naphthalocyanines or other azaannulene chromophores of this invention can be used by itself as recording layer or in combination with a polymer. However, any polymer present should not adversely affect the capability of the recording layer to show positive contrast or the enhancement of the magnitude of such contrast. The preferred embodiments comprise the mixture of azaannulenes to at least about 80% of the total weight of the mixture. Conventional methods of coating may be utilized with the chromophores of the present invention, with spin coating techniques being the most preferred since it allows for a high degree of control of film thickness and flatness. Several silicon naphthalocyanines are soluble in, for example, the solvents described in U.S. Pat. No. 4,997,744, which do not attack the conventional plastic substrate materials. However, if a solvent that may attack the substrate material is chosen, suitable protective techniques for the substrate, such as, for example, subbing layers, may be used. Subbing or smoothing layers are also used occasionally to smoothen out the surface of the substrate if the surface is not smooth enough. Such techniques are well known to those skilled in the art. A preferred subbing layer is a layer of polyvinyl alcohol or an acrylate formulation. Additional undercoating layers may also be used on the substrate depending on the application. The substrate may be optically featureless or may contain preformatting information such as, for example, tracking groove, readable marks containing encoded information, and the like.

The material of which the substrate is comprised is generally a material exhibiting good mechanical strength and good structural integrity against warping. Examples of suitable materials include aluminum, glass, reinforced glass, ceramics, polymethacrylates, polyacrylates, polycarbonates, polyesters, polyimides, epoxy resins, phenolic resins, polyolefins, polyethersulfones, polyether ketones, polyphenylene sulfide, and nylon. Polycarbonate is a preferred material. The size, and shape of the substrate, and hence the recording medium, can vary depending on the application. The shape and format, for example, may be a disk, tape, belt or drum. A disk or tape format is most preferred. Disks of polycarbonate are commercially available for CD applications, and are suitable for practicing the invention.

The actual structure of the recording medium itself may also vary in that the recording layer may be coated on one side or both sides of the substrate. Or, two substrates having the recording layer on either side can be combined allowing the sides having the recording layers to face each other at constant distance, the combined substrates being sealed to prevent dust contamination and scratches.

Protective layers or covers can also be used on the recording layer, if desired. The high sensitivity of the recording medium of the present invention, and the low power requirements for writing, permit the use of a protective layer as a preferred embodiment.

In a typical experiment, two silicon naphthalocyanines, of Formula 2 and of Formula 3, are powdered and mixed in a ratio of, for example, 3:1 (w/w) respectively. This powder is dissolved, to form a suitable concentration such as, for example, about 2-4 weight percent, in a suitable solvent such as, for example, cyclopentanol. Alternatively, solutions of the individual silicon naphthalocyanines in cyclopentanol may be made in suitable concentrations, and combined to make up a mixed solution wherein the weight ratio of the naphthalocyanines of formula 2 and 3 is 3:1. The solution is typically filtered through microporous membranes made of polytetrafluoroethylene (Teflon®, from E. I. duPont de Nemours & Co., Wilmington, Delaware) to remove any insolubles. The filtered solution can be directly spin coated onto a suitable substrate such as, for example, a polycarbonate disk, of suitable size, for example, with diameter of about 5.25 inches. In a typical example, spin coating may be performed at spin speeds of about 800-2,500 rpm for periods in the range of about 30-120 seconds. Drying of the films typically leave film thicknesses of about 500-1,000 Angstroms on the surface of the polycarbonate.

The optical recording medium may be irradiated with a focused laser source at a wavelength at which the recording layer material absorbs, which, for the above naphthalocyanines, is around 770-840 nm. The power of the laser need only be about 5–8 mW or less for the writing to take place. It is preferred that the power of the writing laser be in the range of from about 2 to about 5 mW, with a range of about 2–4 mW being the most preferred. This is in contrast to a laser power of about 10 mW or more, which is generally required for deformation processes using azaannulenes.

Using such low power lasers for writing, one still sees a reflectivity change in the irradiated areas. This reflectivity change is measured by standard methods practiced in the industry and well known to those skilled in the art. It is found to be increased reflectivity so that during the reading mode the reading beam observes this as a positive contrast. Furthermore, the irradiation is of insufficient power to create or effect any type of visually or optically detectable deformation in the surface of the information layer. Thus, the geometrical and physical structure of the information layer remains the same after the writing process. The reading is typically done with a laser beam of much lower power, generally around 0.5 mW or less, so no writing occurs. Because of the high positive contrast between the marked and unmarked areas, even such low power read beams can easily discern the writing efficiently.

The process is then repeated with disks prepared from the individual silicon naphthalocyanines of Formulas 2 and 3, and the increase in reflectivity is measured in each case. Results of a typical experiment are shown in Table 1. Comparison of the results show a surprising change in the magnitude of the positive contrast as one goes from the individual naphthalocyanine-containing recording media to the mixture-containing recording media. Recording medium containing only the compound of Formula 2 as the recording layer shows a positive contrast of about 8% on marking at about 2 mW. At the same power, recording medium containing only the compound of Formula 3 shows a positive contrast of about 7%. Recording medium containing a 3:1 mixture of compounds of Formula 2 and 3 as recording layer, on the other hand, shows a positive contrast of about 23%, substantially higher than the positive contrasts of the recording layers from the individual naphthalocyanines.

Similar to changing the respective quantities of the silicon naphthalocyanines to form recording media with high positive contrasts, changing the components in the mixture produces a dramatic surprising result. For example, as Table 1 shows, a recording medium prepared from a 3:1 mixture of respective compounds of Formulas 2 and 4 as the recording layer, shows a surprisingly high positive contrast of almost 68% at about 2 mW of write power. The individual naphthalocyanines by themselves exhibit much less positive contrast (about 8% and 28% respectively), thus demonstrating the superior utility of the recording media of the present invention.

The following Examples are provided in order to further illustrate the present invention; however, the invention is in no way limited thereby.

EXAMPLES

In the following Examples, g refers to grams, ml to milliliters, ° C. to degrees Celsius, rpm to revolutions per minute, to milliwatts, nm to nanometers, ns to nanoseconds, and m/s to meters per second. Positive contrast ($\Delta R/R$) is measured as the ratio of difference in reflectivity upon marking to the original reflectivity.

EXAMPLE 1

Spin coating of film of silicon naphthalocyanine of Formula 2 on polycarbonate substrate Compound of Formula 2 (3.0 g) and cyclopentanol (97 g) were charged into a 250 ml Erlenmeyer flask, equipped with a magnetically stirring bar and thermometer, and stirred magnetically on a hot plate at about 60–80° C. for about 90 minutes. The solution was cooled to ambient temperature, and then filtered through a Teflon ® microporous membrane (0.2 μm pore size). It was then spin coated onto a polycarbonate disk (diameter: 5.25 inches, supplied by Idemitsu Petrochemicals Co., Ltd., Kimitsu-Gun, Chiba-Ken, 299-02, Japan) at 1,600 rpm for 60 seconds, using a Solitec model 5100 spin coater (from Solitec Inc., Santa Clara, California). The film was then dried in an air convection oven at 80° C. for 30 minutes. In a similar manner, films were prepared on polycarbonate substrates from silicon naphthalocyanines of Formulas 3 and 4 (Examples 2 and 3 respectively in Table 1), from a 3:1 (w/w) mixture of compounds of Formulas 2 and 3 respectively (Example 4 in Table 1), and from a 3:1 (w/w) mixture of compounds of Formulas 2 and 4 respectively (Example 5 in Table 1).

EXAMPLE 6

Laser Irradiation and measurement of Positive Contrast on disk from Example 1

The coated disk from Example 1 was irradiated with a 830 nm laser, with various laser powers ranging from 2–8 mW, using 500 ns pulses, at 4 m/s spinning rates, using standard techniques, and reflectivities in the marked and unmarked areas were measured. Positive contrast ($\Delta R/R$) was calculated as the ratio of difference in reflectivity upon marking to the original reflectivity. Results of positive contrast measured at 2 mW are shown in Table 1. In a similar manner, positive contrast was measured on the disks prepared in Examples 2 through 5, and results are included in Table 1.

TABLE 1

| | Positive Contrast at 2 mW write power, 500 ns pulses, 4 m/s spin, 830 nm | |
|---|---|---|
| Example No. | Formula of compound for recording layer | Positive Contrast ($\Delta R/R$) (%) |
| 1 | 2 | 8 |
| 2 | 3 | 7 |
| 3 | 4 | 28 |
| 4 | 2:3 (3:1) | 23 |
| 5 | 2:4 (3:1) | 68 |

What is claimed is:

1. An optical information recording medium, which comprises, in its information recording layer, a mixture of at least two azaannulene compounds, wherein said mixture contains at least about 10% of each of said azaannulene compounds, and wherein an enhanced positive contrast reflectivity change is effected in the recorded areas by cooperation of the components in said mixture, and wherein said enhanced positive contrast is larger than the positive contrasts exhibited by recording layers formed from the individual azaannulenes included in said mixture.

2. The optical information recording medium of claim 1, wherein said azaannulene compounds are naphthalocyanines.

3. The optical information medium of claim 2, wherein said naphthalocyanines are silicon naphthalocyanines.

4. A process for obtaining positive contrast reflectivity change in recorded areas of an optical information recording medium by (i) providing in said recording medium an information recording layer which comprises a mixture of at least two azaannulene compounds, wherein said mixture contains at least about 10% of each of said azaannulene compounds, and (ii) recording with laser radiation, wherein the components of said mixture cooperate to enhance the positive contrast with respect to the positive contrasts exhibited by recording layers formed from the individual azaannulenes included in said mixture.

5. The process of claim 1, wherein said azaannulene compounds are naphthalocyanines.

6. The process of claim 5, wherein said naphthalocyanines are silicon naphthalocyanines.

7. The process of claim 4, wherein said laser radiation has powers of about 8 mW or less.

8. The process of claim 7, wherein said laser radiation has powers from about 2 to about 5 mW.

9. The process of claim 4, wherein said reflectivity change is unaccompanied by a visually detectable deformation in the irradiated areas.

10. The process of claim 4, wherein said mixture comprises two azaannulenes.

11. The process of claim 10, wherein said azaannulenes are naphthalocyanines.

12. The process of claim 11, wherein said naphthalocyanines are represented by the formula:

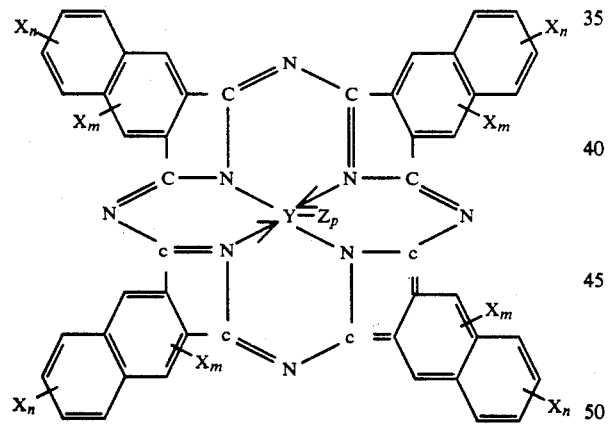

wherein Y is Si, Ge, Sn, Al, Ga, In or a transition metal, more preferably Si or Ge, and most preferably Si;

Z is a halogen, hydroxy, $OR_1$ or $OSiR_2R_3R_4$, wherein $R_1$ is an alkyl having at least four carbons; aryl having at least six carbons; acyl having at least four carbons; cycloalkyl having at least four carbons; or a polyether, and wherein $R_2$, $R_3$ and $R_4$ can be the same or different and are alkyl having from about 1 to about 18 carbons; aryl having from 6 to 10 carbons; cycloalkyl having at least 4 carbons; siloxy; or alkoxy having at least 3 carbons;

with p representing the number of Z substituents and being either 0, 1 or 2, more preferably 1 or 2, and most preferably 2; and wherein the X substituents can be the same or different and are independently selected from halogen,; alkyl having at least 4 carbons; aryl having from 6 to 10 carbons; acyl having at least 4 carbons; $NR_5R_6$; $NO_2$; $OR_7$; $SO_3$—; or $SO_2NR_5R_6$, with $R_5$ and $R_6$ being the same or different and being H; alkyl having form 1 to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and wherein the X substituent is attached to the aromatic ring through the N atom when the substituent is $NR_5R_6$, $R_7$ is the same as R defined above, and with n and m indicating the number of independently selected X substituents, each n being the same or different and ranging from 0 to 4, and each m being the same or different and ranging from 0 to 2.

13. The process of claim 12, wherein said naphthalocyanines are selected from the compounds of the formula:

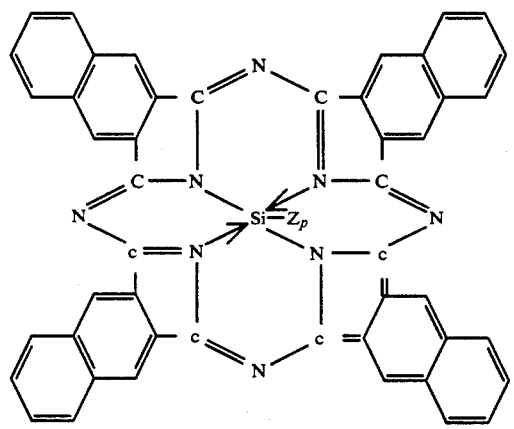

wherein $Z_p=$[O—Si $(CH_3)_2$—O—$(CH_2)_6$—NH—CO—$(CH_2)_{14}$—$CH_3]_2$; $Z_p=$[O—Si $(CH_3)_2$—O—$(CH_2)_6$—NH—CO—CH $(CH_3)_2]_2$;

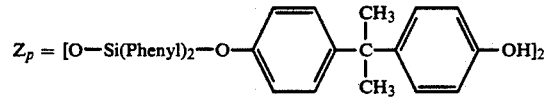

14. The process of claim 4, wherein said optical information medium provided is in disk format and contains tracking grooves, with the irradiation following said tracking grooves.

15. The process of claim 4, wherein said optical information medium further comprises a protective overcoat layer of said information layer.

* * * * *